United States Patent [19]

Huffman

[11] Patent Number: 5,213,887
[45] Date of Patent: May 25, 1993

[54] ANTISTATIC COATINGS

[75] Inventor: William A. Huffman, Pittsford, N.Y.

[73] Assignee: Minnesota Mining and Manufacturing Company, St. Paul, Minn.

[21] Appl. No.: 753,864

[22] Filed: Sep. 3, 1991

[51] Int. Cl.$^5$ ............................................. B32B 5/16
[52] U.S. Cl. ..................................... 428/323; 428/328; 428/329; 428/331; 428/335; 428/480; 428/500; 428/532; 428/922; 430/527
[58] Field of Search ............... 428/323, 328, 329, 331, 428/480, 500, 335, 922, 532; 430/527

[56] References Cited

U.S. PATENT DOCUMENTS

| | | | |
|---|---|---|---|
| 3,245,833 | 4/1966 | Trevey et al. | 428/328 |
| 3,561,337 | 2/1971 | Mulkey | 428/328 |
| 3,874,878 | 4/1975 | Rasch et al. | 430/526 |
| 3,874,879 | 4/1975 | Rasch | 430/496 |
| 4,134,412 | 1/1979 | Gross et al. | 132/203 |
| 4,203,769 | 5/1980 | Guestaux | 428/922 |
| 4,264,707 | 3/1981 | Uozumi et al. | 430/527 |
| 4,359,518 | 11/1982 | Hanselman et al. | 430/236 |
| 4,373,013 | 2/1983 | Yoshizumi | 428/570 |
| 4,383,022 | 5/1983 | Berger | 430/228 |
| 4,394,441 | 7/1983 | Kawaguchi et al. | 430/524 |
| 4,418,141 | 11/1983 | Kawaguchi et al. | 430/527 |
| 4,436,731 | 3/1984 | Maltz | 514/55 |
| 4,495,276 | 1/1985 | Takimoto et al. | 430/527 |
| 4,585,730 | 4/1986 | Cho | 430/527 |
| 4,701,403 | 10/1987 | Miller | 430/529 |
| 4,703,000 | 10/1987 | Hodgins | 430/527 |
| 4,734,319 | 5/1988 | Doi et al. | 428/323 |
| 4,814,176 | 5/1989 | Makino et al. | 424/470 |
| 4,895,792 | 1/1990 | Aizawa | 430/530 |
| 5,008,178 | 4/1991 | Van Thillo et al. | 428/331 |
| 5,013,601 | 5/1991 | Bothe et al. | 428/323 |

FOREIGN PATENT DOCUMENTS 3189859 8/1988 Japan .
3213839 9/1988 Japan .
1159640 6/1989 Japan .

OTHER PUBLICATIONS

Japanese Kokei No. 1[1989]-159640, published Jun. 22, 1989 (Translation provided).
Encyclopedia of Polymer Science and Engineering, 1987 "Chitin," pp. 430-441.
Journal of Membrane Science, 16 (1983) 295-308 "The Characterization of N-Methyl, N-Ethyl, N-Propyl, N-Butyl and N-Hexyl Chitosans, Novel Film-Forming Polymers".
"Protan Biopolymers".

Primary Examiner—Paul J. Thibodeau
Assistant Examiner—D. S. Nakarani
Attorney, Agent, or Firm—Gary L. Griswold; Walter N. Kirn; Mark A. Litman

[57] ABSTRACT

A bilayer coating of layers of inorganic metal oxide sol and a layer of a chitosan salt provides improved antistatic properties over a polymeric film substrate.

12 Claims, No Drawings

ANTISTATIC COATINGS

BACKGROUND OF THE INVENTION

1. Field of the Invention

The present invention relates to the prevention of static buildup on polymeric materials by the addition of antistatic layers to those materials. In particular, the invention relates to antistatic coatings in association with imageable materials.

2. Background of the Art

Many different polymeric materials have been long recognized as suffering from electrostatic charge buildup during use. The problems associated with such static charging may be as modest as sparks from moving about on polymeric carpeting and popping sounds on phonograph records or as serious as memory erasure on computer disks and false artifacts in photographic film.

One usual method of reducing static buildup is the addition of a conductive layer or low surface resistivity layer to the polymeric article. It is common in the protection of shaped polymeric articles, including carpets, to treat the polymer with reactive or absorbable salts (e.g., U.S. Pat. 3,309,223 and 4,313,978). It is also known to form layers of inorganic metal oxides, either in film or particulate form to decrease the surface resistivity (e.g., U.S. Pat. 4,203,769 and 4,394,441). These antistatic coatings are known to be particularly desirable and useful as subbing layers in photographic articles (e.g., U.S. Pat. 3,874,879).

Chitosan is an organic material derived from the shells of arthropods such as shrimp, crab, and lobster. Chemically, it is a d-glucosamine. Chitosan and its derivatives have been known to be used in diffusion transfer films (e.g., U.S. Pat. 4,386,151 and 4,383,022), cosmetic base (e.g., EPO 0 198 246), in paper products as an absorbent (e.g., JP 62-064803), and as part of a particulate antistatic coating on the back side of photographic base, especially photographic paper (JP 62-319842). The chitosan in that Japanese Patent Publication may be mixed with colloidal silica or alumina and may contain other additives such as antistatic modifiers. The solution is preferably coated at a pH above 5.0 to prevent effects on the photographic emulsion. The coatings are not transparent and the resistivity of compositions within and outside the invention are similar, suggesting little antistatic effect from the chitosan.

SUMMARY OF THE INVENTION

A solution of a chitosan-acid salt is coated over a layer of a dried anionic inorganic metal oxide colloidal suspension on the surface of a polymeric material. The resulting substantially optically clear and transparent coating comprising the inorganic metal oxide layer bonded to a chitosan polymer overcoat layer is an effective and stable antistatic protection layer.

DETAILED DESCRIPTION OF THE INVENTION

The antistatic coatings of the present invention are particularly beneficial and capable of a broad range of use at least in part because of their optical transparency, water-insolubility, and low surface resistivity. Optical transparency is important when the protected substrate or article is to be imaged, viewed, or projected. Water-insolubility is significant where the antistatic layer is a surface layer or the article is to be treated or processed in aqueous solutions. Low surface resistivity is an indication of the degree of efficiency which the antistatic layer is capable of providing.

The protective layer of the present invention is formed by the application of two coating compositions, preferably aqueous coating compositions, onto the surface of a polymeric substrate. The coating compositions must comprise a first composition as a colloidal dispersion of an anionic inorganic metal oxide in an aqueous solution (e.g. as of sol), a second composition as a solution of a chitosan acid salt. The colloidal dispersion must be of an anionic inorganic metal oxide to enable the chitosan acid salt to react and bond or adsorb thereto at the interface of the coatings. The chitosan must be in the form of an acid salt in order for it to be in solution. If the chitosan is not in solution, it would not coat out as a distinct phase but would be deposited as a mixture of chitosan film and particles. Even when dissolved, some minor amount of the chitosan acid salt may appear as particles when deposited, but most of the chitosan (at least 90%, preferably at least 95% to 100%) will be present as a film or phase bonded to the inorganic oxide particles.

One measurement of antistatic property is the surface resistivity of a coating. The units for measuring surface resistivity are ohms per square. The measurement relates to the ability of the coating to dissipate surface static electric charges. The lower the resistivity, the better that property is. Surface resistivity numbers in the $10^9$–$10^{11}$ ohms/sq are considered to be 'good' for static protection. The other measurement used in determining antistatic protection is that of charge decay. In measuring this quality, an electric charge (measured in volts) is applied to the surface of the film and the time in seconds for the electric field generated by the surface to zero is measured. For excellent static protection, the charge decay time (+5000v to '0') should be less than one second, and preferably less than 0.1 second. As a rule of thumb, if the charge decay time is 0.10 sec. or less (0.01 sec is the detection limit of many instruments), then the antistatic coating is effective for use as an underlayer. In this case, poorly conductive coatings are applied over the antistatic coating. Obviously, low surface resistivity is not directly important in this application because the surface of the antistatic coating is buried under non-conducting materials. Nevertheless, static protection is provided in an indirect manner insofar as the conductive layer is able to neutralize the external electric field of the surface static charges by formation of an internal electric field. This type of protection is effective for, e.g., the prevention of 'static cling' between sheets and with dust particles. This type of static protection is particularly notable in some commercial film, which have relatively poor surface resistivity ($10^{13}$ ohms/sq), but extremely low charge decay times. Other new photographic films have both good charge decay and surface resistivity properties.

An important distinction among antistatic coatings is the type of conductor. They can be either ionic conductors or electronic conductors. In general, if the surface resistivity and charge decay properties depend on the amount of moisture in the air, the coating is termed an ionic conductor, and if the properties do not depend on humidity, it is an electronic conductor.

The above serves to distinguish the chitosan/sol antistats of the present application. First, the chitosan/sol coatings are ionic-type conductors, that is the conductive property depends on the amount of moisture in the air. However, in our case, the dependency is not great, as the coatings are still functional as antistatic underlayers even at 15% RH and 20° C. (depending on thickness and chitosan level). Typical surface resistivity values of the coatings (before they are overcoated) are $1 \times 10^8$ to $5 \times 10^9$ ohms/sq. Typical charge decay numbers after overcoating are 0.01 sec. at 40% RH.

The chitosan nitrate/sol coatings have many beneficial properties. They are anti-reflective, and so increase the light transmission at certain wavelengths depending on the coating thickness. The adhesion of the coatings is excellent to chemical primers with acid functionality, and to physically modified film (e.g., corona treated). Chitosan is fully compatible with gelatin, and undergoes the same cross-linking reactions; therefore the adhesion is excellent.

Furthermore, chitosan nitrate does not interfere with any of the photographic properties of graphic arts film. Therefore it can be used as an underlayer on the light-sensitive side of the assemblage as well as on the non-light-sensitive side; or it can be applied as with normal subbings, to both sides of the base film. Also, it can be used as an antistatic topcoat. The coatings of this invention also exhibit a low contact angle with water, which makes it useful as a subbing for high speed coating. when chitosan is used as a low molecular weight polymer, it shows the property of migrating into the gelatin-containing layers, and imparts improved surface resistivity to them. For instance, the surface resistivity of an overcoated emulsion layer might increase from $5 \times 10^{13}$ ohms/sq. without the coating to about $1 \times 10^{11}$ with the low molecular weight coating of the invention as an underlayer. It is notable here that some newer antistatic photographic films add an ionic polymer to the gelatin-containing layer above the antistatic layer which is different than the polymer in the antistatic layer.

The coating weight of each of the two antistatic layers of the invention will be less than 0.8 g/meter$^2$ and preferably less than 0.3 g/meter$^2$ on each surface of the film in a two-sided application.

The colloidal inorganic oxide solution or dispersion used in the present invention comprises finely divided solid inorganic metal oxide particles in a liquid. The term "solution" as used herein includes dispersions or suspensions of finely divided particles of ultramicroscopic size in a liquid medium. The solutions used in the practice of this invention are clear to milky in appearance. Inorganic metal oxides particularly suitable for use in the present invention are those in which the metal oxide particles are negatively charged (anionic), which includes, for example, tin oxide ($SnO_2$), titania, antimony oxide ($Sb_2O_5$), silica, and alumina-coated silica as well as other inorganic metal oxides of Groups III and IV of the Periodic Table and mixtures thereof which form negatively charged sols. The selection of the inorganic metal oxide is dependent upon the ultimate balance of properties desired.

The colloidal coating solution preferably contains about 0.2 to 15 weight percent, more preferably about 0.5 to 8 weight percent, colloidal inorganic metal oxide particles. At particle concentrations above about 15 weight percent, the resulting coating may have reduced uniformity in thickness and exhibit reduced adhesion to the substrate surface. Difficulties in obtaining a sufficiently thin coating to achieve increased light transmissivity may also be encountered at concentrations above about 15 weight percent. At concentrations below 0.2 weight percent, process inefficiencies result due to the large amount of liquid which must be removed and beneficial properties may be reduced.

The thickness of the applied wet coating solution is dependent on the concentration of inorganic metal oxide particles and chitosan nitrate in the coating solutions and the desired thickness of the dried coatings. The thickness of the wet coating solution is preferably such that the resulting dried coating thickness is from about 450 to 4500 nm thick, more preferably about 600 to 2500 nm thick for each coating.

The coating solution may also optionally contain a surfactant to improve wettability of the solution on the substrate, but inclusion of an excessive amount of surfactant may reduce the adhesion of the coating to the substrate. Suitable surfactants for this system would include compatible surface-tension reducing organic liquids such as n-propanol, and surfactants which are salts of very strong acids such as naphthalene sulfonic acid or perfluorooctyl sulfonic acid. Generally the surfactant can be used amounts of up to about 0.5 weight percent of the solution.

The coating solution may optionally contain a very small amount of polymeric binder, particularly a hydrophilic polymer binder, to improve scratch resistance, or to reduce formation of particulate dust during subsequent use of the coated substrate, or to control or increase the surface sensitivity of the antistatic layer. Useful polymeric binders include polyvinyl alcohol, polyvinyl acetate, gelatin, polyesters, polyamides, polyvinyl pyrrolidone, copolyesters, copolymers of acrylic acid and/or methacrylic acid, and copolymers of styrene. The coating solution can contain up to about 5 or 10 weight percent of the polymeric binder based on the weight of the inorganic metal oxide particles. Useful amounts of polymeric binder are generally in the range of about 0.1 to 5 weight percent. These binders can reduce some of the beneficial properties (e.g., antistatic properties) of the coatings if used in larger amounts, so that they are not most preferred.

The average primary particle size of the colloidal inorganic metal oxide particles is generally less than 50 nm, preferably less than 20 nm, and more preferably less than 10 nm. Some very useful commercial colloidal suspensions have average primary particle sizes less than 7 nm. Examples of commercially available colloidal inorganic metal oxide solutions are Nalco TM 2326, colloidal silica; Nalco TM 1115, colloidal silica; Nalco TM 1060, colloidal silica; Nalco TM 1034A, colloidal silica, Nalco TM T-2588, colloidal titania; 1SJ-612 colloidal silica/alumina; and Nyacol SN-20, colloidal stannic oxide.

The coating solution of chitosan nitrate and inorganic metal oxide solution usually comprises from 1 to 65% by weight solids of the polymer and 99 to 35% by weight solids of the inorganic metal oxide particles. The coating composition more preferably contains from 3 to 40% by weight solids of the polymer and 97% to 60% of the inorganic metal oxide particles. More preferably the composition comprises 8 to 25% by weight solids of the chitosan and 92 to 75% by weight of the inorganic metal oxide particles.

The coating composition should be applied in sufficient amounts to the surface so that a dried coating of 25-2000 nm is produced. Preferably the coating is 50-1200 nm dried thickness. More preferably the dried coating is 75-800 nm in thickness and the most preferred coating thickness is about 100-300 nm.

Chitosan is an organic polymeric material derived from chitin. Chitin is the most abundant organic skeletal component of invertebrates and is the characteristic polysaccharide of such phyla as Arthopoda, Annelida, Mollusca, and Coelenterata. Chitin can be described as (1-4)-linked 2-acetamido-2-deoxy-o-b-glucan. Chitosan is obtained from chitin by deacetylation of the chitin, usually by strong alkalis. After deacetylation, the chitosan will contain from 5 to 8% nitrogen, mostly in the form of primary amino groups. The amino group on the chitosan may be alkylated (preferably $C_1$ to $C_{12}$ alkylation, most preferably methylated or ethylated). This alkylated chitosan offers some significant processing advantages during coating. Some acid salts of chitosan are known to form reticulate structures upon coating. The presence of the alkylated (secondary) amine group greatly reduces the tendency of the dried chitosan to form a reticulated structure. A smoother film characteristic is produced with the alkylated chitosan. Increasing the molecular weight of the chitosan also helps to reduce reticulation in the final coating.

The chitosan, either alkylated or not, is mixed with an acid to form an aqueous soluble salt. The acid used to form the salt should be at least as acidic as acetic acid (e.g., $pKa \leq 5.0$) such as, for example, acetic acid, nitric acid, hydrochloric acid, hydrobromic acid, nitrous acid, benzoic acid, maleic acid, hydrofluoric acid, boric acid, phosphoric acid, phosphonic acid, trifluoromethane sulfonic acid, etc. An acid which forms a chitosan sulfate is not useful as the sulfate salt tends to be uniquely water insoluble.

The aqueous soluble chitosan acid salt is then maintained at a pH less than 5.0 and preferably less than 4.0. It is important to keep the solution of chitosan salt at this low pH in order to keep the chitosan in solution. At higher pH levels, the chitosan will eventually precipitate, or the mixture will gel. If such higher pH aqueous compositions are coated, there would be no continuous phase of chitosan (there would be bound particulates) and, more importantly, the coated layer would not be optically transparent but would be at least milky. It is more preferred that the pH of the composition be maintained below 3.50 and more preferably that the pH be maintained between 1.50 and 3.50, preferably between 2.50 and 3.25. This stable coating composition is then coated onto the substrate and dried. Drying may be by air drying, forced air drying, oven drying, infrared heating, or the like. Typically oven drying between 40 and 120° C. is preferred.

When coated out and dried, the chitosan polymer (having cationic groups thereon) absorbs to the surface of anionic metal oxide particles in the previously coated and dried metal oxide particle layer. This is a very strong adsorption which binds the polymer (chitosan) strongly to the particles. The chitosan forms a film or phase which bonds to the particles on the surface of the particle layer. Some of the particles may also be touching and may be bonded together by gelling, chemical linkages, or other bonding forces.

As previously noted, other ingredients such as surface active agents, coating aids, polymers, antistatic modifiers, antihalation dyes, gelatin, polysaccharides, ultraviolet radiation absorbers, coupling agents, bonding aids, and the like may be included in the coating solution. These and other aspects of the invention will be shown in the following non-limiting examples.

Measurement of antistatic property: two methods were used to measure the effectiveness of the antistatic layer. In the principal method, an ETS Charge Decay Meter, Model #406C was utilized to measure the time in seconds for an applied surface electric charge of +5000 volts to decay to 'zero'. This will be referred to as the Charge Decay (CD) time. The second less preferred method, was done to provide an alternative reference. The Surface Resistivity (SR) of the layer in Ohms/sq. was measured with a Keithley Model 6105 Resistivity Adaptor combined with a Keithley 610B Electrometer and a 500v power source.

Example 1

Preparation of chitosan nitrate salt: Low molecular weight ground chitosan (Sea Cure TM 143 from Protan Inc., Raymond Wash. USA) was utilized as follows: 40 g of Sea Cure TM 143 chitosan was slurried with 900 ml of deionized water. With rapid mixing, 16 g of conc. nitric acid (70 wt%) was added. After about 1-2 hours of mixing the pH of the solution was checked and found to be 4.2. This value will vary since Sea Cure TM 143 is not a pure product. The pH should be no higher than 4.7. If necessary it may be adjusted to 4.7 by adding 1N $HNO_3$ dropwise to the stirred solution as it is monitored by a pH meter. The total weight of the solution was adjusted to 1000 g with water and the solution was filtered through cheesecloth to remove debris. Chitosan nitrate salt content was 5%±1%.

EXAMPLE 5

Forty grams of NALCO 2326 Colloidal Silica was mixed with 60 grams deionized water to make an approximately 6% solids sol. To this solution was added 0.03 g FC 128 surfactant which previously had been diluted by 10 to 1 with deionized water. This sol was then drawn onto a graphic arts film substrate consisting of about 4 mil. (0.1 mm) polyethylene terephthulate base which had been previously primed with polyvinylidenedichloride at about 1000Å thickness. The coating was applied using a wire-wound rod and air dried to yield a continuous silica film of about 1500Å in average thickness.

Next a 4% solids solution of methylchitosan nitrate (N 30 cps viscosity) was prepared, in water, and about 0.03 g FC 128 fluorinated surfactant was added as above to 100 ml of the methylchitosan Nitrate solution. This solution was applied by a similar drawdown technique to the silica coated filmbase of the above described construction, to form, upon drying, an outer layer of approximately 2000Å thickness, which consists of a smooth film of methylchitosan Nitrate polymer, intimately bound to the porous silica underlayer at the silica/methyl chitosan nitrate interface. Since the silica layer is extremely porous the methyl chitosan nitrate is provided with a large surface area at the interface of the elements, and indeed, well into the silica with which to interact and become bound. This composite now forms a very effective antistatic element, as well as a highly desirable coatable surface onto which is applied a photographic gelatin layer, either gelatin with, or gelatin without the presence of silver halide grains.

Values of surface resistivity (R) were measured, as well as charge decay (CD) before (bp) processing and after processing (ap).

|  | Rap | CDbp | Rap | COap |
|---|---|---|---|---|
| Element of Example | $1 \times 10^8$ | 0.01 | $2.10^{10}$ | 2.2 |

Accordingly, the film base of the above example is then overcoated with a typical graphic arts, silver halide emulsion, and topcoat. The photographic element, after drying for 24 hours, was tested for surface resistivity and charge decay, as well.

|  | Rap | CDbp |
|---|---|---|
| Emulsion coated before processing | $2.10^9$ | 0.2 |
| after process | $8.10^{10}$ | 4.0 |

The photographic emulsion exhibited excellent dry and wet adhesion to the antistatic underlayer of the invention.

What is claimed is:

1. A substrate having an antistatic protective coating thereon, said coating comprising an optically, transparent layer of chitosan acid salt over a layer of anionic inorganic metal oxide colloidal particles.

2. The substrate of claim 1 wherein said substrate comprises organic polymeric material.

3. The substrate of claim 2 wherein said organic polymeric material is in the form of a sheet or film and said antistatic coating has a thickness of from 25-2000 nm.

4. The substrate of claim 3 wherein said chitosan acid salt has been alkylated.

5. The substrate of claim 4 wherein said alkylated chitosan acid salt has been methylated or ethylated.

6. The substrate of claim 2 wherein said inorganic metal oxide colloidal particles comprise silica, titania, stannic oxide or mixtures thereof.

7. The substrate of claim 3 wherein said inorganic metal oxide colloidal particles comprise silica, titania, stannic oxide or mixtures thereof.

8. The substrate of claim 5 wherein said inorganic metal oxide colloidal particles comprise silica, titania, stannic oxide or mixtures thereof.

9. An organic polymeric film having on at least one surface thereof an optically transparent antistatic protection layer comprising a first layer of a chitosan acid salt and a second layer of anionic inorganic metal oxide colloidal particles, said layer of colloidal particles being between said film and said first top layer.

10. The film of claim 9 wherein both sides of said film have said antistatic protection layer thereon.

11. A substrate having an antistatic protective coating thereon, said coating comprising an optically transparent layer of chitosan acid salt over a layer of inorganic metal oxide colloidal particles which is adhered to said substrate, the acid of said acid salt having a pH of less than 5.0.

12. An organic polymeric film having on at least one surface thereof an optically transparent antistatic protection layer comprising a first layer of a chitosan acid salt over a layer of anionic inorganic metal oxide colloidal particles, said layer of particles being adhered to said film, and the acid of said acid salt having a pH of less than 5.0.

* * * * *

UNITED STATES PATENT AND TRADEMARK OFFICE
CERTIFICATE OF CORRECTION

PATENT NO. : 5,213,887
DATED : May 25, 1993
INVENTOR(S) : William A. Huffman

It is certified that error appears in the above-indentified patent and that said Letters Patent is hereby corrected as shown below:

Column 3, line 30, "increase" should be --decrease--

Column 6, line 29, "Example 5" should be --Example 2--

Column 8, line 15, "first top layer" should be --first layer--

Signed and Sealed this

Twenty-sixth Day of April, 1994

Attest:

BRUCE LEHMAN

*Attesting Officer*   *Commissioner of Patents and Trademarks*